(12) United States Patent
Zywicki et al.

(10) Patent No.: US 11,818,446 B2
(45) Date of Patent: Nov. 14, 2023

(54) SYNTHESIS OF THERMAL HYPERSPECTRAL IMAGERY

(71) Applicant: Raytheon Company, Waltham, MA (US)

(72) Inventors: Randall W. Zywicki, McKinney, TX (US); David Christopher Mann, Frisco, TX (US)

(73) Assignee: Raytheon Company, Waltham, MA (US)

( * ) Notice: Subject to any disclaimer, the term of this patent is extended or adjusted under 35 U.S.C. 154(b) by 216 days.

(21) Appl. No.: 17/351,828

(22) Filed: Jun. 18, 2021

(65) Prior Publication Data

US 2022/0408034 A1   Dec. 22, 2022

(51) Int. Cl.
| | | |
|---|---|---|
| *H04N 23/11* | (2023.01) | |
| *G01J 5/56* | (2006.01) | |
| *G01J 5/54* | (2006.01) | |
| *G01J 5/53* | (2022.01) | |
| *G01J 5/00* | (2022.01) | |

(52) U.S. Cl.
CPC ............. *H04N 23/11* (2023.01); *G01J 5/53* (2022.01); *G01J 5/54* (2013.01); *G01J 5/56* (2013.01); *G01J 2005/0077* (2013.01)

(58) Field of Classification Search
None
See application file for complete search history.

(56) References Cited

U.S. PATENT DOCUMENTS

| | | | | |
|---|---|---|---|---|
| 6,665,438 | B1 * | 12/2003 | Lin ...................... | G06F 18/2134 382/260 |
| 6,678,632 | B1 * | 1/2004 | Iannarilli, Jr. ......... | G01N 21/21 702/153 |

(Continued)

FOREIGN PATENT DOCUMENTS

| | | |
|---|---|---|
| CN | 110987821 A | 4/2020 |
| CN | 111707373 A | 9/2020 |

OTHER PUBLICATIONS

Acito, N., et al., "Coupled Subspace-Based Atmospheric Compensation of LWIR Hyperspectral Data", IEEE Transactions on Geoscience and Remote Sensing, vol. 57, No. 8, (Aug. 2019), 5224-5238.

(Continued)

*Primary Examiner* — Stefan Gadomski
(74) *Attorney, Agent, or Firm* — Schwegman Lundberg & Woessner, P.A.

(57) ABSTRACT

A system simulates hyperspectral imaging data or multispectral imaging data for a simulated sensor. Blackbody radiance of real-world thermal imagery data is computed using a Planck function, which generates a simulated spectral hypercube. Spectral emissivity data for background materials are multiplied by a per-pixel weighting function, which generates weighted spectral emissivity data. The simulated spectral hypercube is multiplied by the weighted spectral emissivity data, which generates background data in the simulated spectral hypercube. Simulated targets are inserted the background data using the Planck function. The simulated spectral hypercube is modified, and then it is used to estimate a mission measure of effectiveness of the simulated sensor.

20 Claims, 6 Drawing Sheets

(56) References Cited

U.S. PATENT DOCUMENTS

| | | | |
|---|---|---|---|
| 7,554,667 B1* | 6/2009 | Kampe | G01J 3/2823 356/454 |
| 7,795,583 B1 | 9/2010 | Hubbard et al. | |
| 7,796,833 B2 | 9/2010 | Polonskiy et al. | |
| 8,660,359 B2* | 2/2014 | Conger | G06V 10/30 382/191 |
| 9,218,690 B2 | 12/2015 | Buehler et al. | |
| 10,088,251 B2* | 10/2018 | Raman | F24F 5/0089 |
| 10,338,272 B2 | 7/2019 | Xiang et al. | |
| 2010/0008595 A1* | 1/2010 | Riley | G06T 5/007 382/254 |
| 2014/0270332 A1* | 9/2014 | Pacifici | G06T 5/001 382/100 |
| 2015/0044098 A1 | 2/2015 | Smart et al. | |
| 2015/0235102 A1 | 8/2015 | Blagg | |
| 2015/0302567 A1* | 10/2015 | Patterson | G06V 20/13 382/191 |
| 2019/0049310 A1* | 2/2019 | Osamu | G01J 5/061 |
| 2020/0096388 A1* | 3/2020 | Pagano | G01J 3/021 |
| 2020/0109990 A1* | 4/2020 | Campbell | G01J 3/0254 |

OTHER PUBLICATIONS

Adler-Golden, Steven, et al., "Modeling and analysis of LWIR signature variability associated with 3-D and BRDF effects", Proc. SPIE 9840, Algorithms and Technologies for Multispectral, Hyperspectral, and Ultraspectral Imagery XXII, (May 17, 2016), 7 pgs.

Griffin, Michael K., et al., "A procedure for embedding effluent plumes into LWIR imagery", Proc. SPIE 5806, Algorithms and Technologies for Multispectral, Hyperspectral, and Ultraspectral Imagery XI, (Jun. 1, 2005), 78-87.

Ientilucci, Emmett J., et al., "Advances in Wide Area Hyperspectral Image Simutaion", Proc SPIE, vol. 5075, (2003), 110-121.

Kim, Sungho, et al., "Extremely Robust Remote-Target Detection Based on Carbon Dioxide-Double Spikes in Midwave Spectral Imaging", Sensors 2020, 20, 2896, (May 20, 2020), 21 pgs.

Kim, Sungho, "Novel Air Temperature Measurement Using Midwave Hyperspectral Fourier Transform Infrared Imaging in the Carbon Dioxide Absorption Band", Remote Sens. 2020, 12, 1860, (Jun. 8, 2020), 23 pgs.

Lane, Cory T., "In-Scene Atmospheric Compensation of Thermal Hyperspectral Imaging With Applications to Simultaneous Short-wave Data Collection", Retrieved online. URL: <https://apps.dtic.mil/dtic/tr/fulltext/u2/1055591.pdf>, (Dec. 1, 2017), 159 pgs.

Pieper, Michael, "Atmospheric Compensation and Surface Temperature and Emissivity Retrieval with LWIR Hyperspectral Imagery", Retrieved online. URL: <https://repository.library.northeastern.edu/files/neu:cj82qg003/fulltext.pdf>, (Aug. 2017), 156 pgs.

Shetler, Bruce V., et al., "Comprehensive hyperspectral system simulation: I. Integrated sensor scene modeling and the simulation architecture", Proc. SPIE 4049, Algorithms for Multispectral, Hyperspectral, and Ultraspectral Imagery VI, (Aug. 23, 2000), 94-104.

Westing, Nicholas M., et al., "Learning Set Representations for LWIR In-Scene Atmospheric Compensation", IEEE Journal of Selected Topics in Applied Earth Observations and Remote Sensing, vol. 13, (2020), 1438-1449.

Zhao, Runchen, et al., "Improvements to an earth observing statistical performance model with applications to LWIR spectral variability", (Abstract Only) Proceedings vol. 10198, Algorithms and Technologies for Multispectral, Hyperspectral, and Ultraspectral Imagery XXIII, (May 5, 2017), 3 pgs.

* cited by examiner

SYNTHESIS OF THERMAL HYPERSPECTRAL IMAGERY

TECHNICAL FIELD

Embodiments described herein generally relate to the synthesis of thermal hyperspectral imagery.

BACKGROUND

Optimal design and test of planetary or earth observation infrared systems requires supporting analysis and simulation tools. To model complete end-tip-end system performance, the model should go beyond engineering metrics (e.g., noise and resolution), and the model should further estimate mission measures of effectiveness (MOE) (e.g., probability of detection for a given probability of false alarm (Pd/PFa)). For hyperspectral and multispectral imaging systems (HSI/MSI), there is no standardized approach to this.

For standard imaging systems, the night vision integrated performance model (NV-IPM) suite of tools provides a widely accepted standard that is used across industry and government to provide probability of mission task. For hyperspectral and multispectral imaging (HSI/MSI), the analysis of engineering measures of performance (MOP), (e.g., noise, spectral resolution, spatial resolution) is well understood and documented in the literature, and there is an effort to standardize on a set of tools. However, there is no tool or method to extend this to MOEs such as Pd/PFa. Additionally, most prior systems simulate worlds in a CAD tool, lay material properties on individual objects and surfaces, and then perform radiometric analysis (e.g., reflectance of sunlight and moonlight, emitted infrared, etc.). As a result, current simulated models do not model clutter surfaces adequately.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

An embodiment is a method for simulating hyperspectral data, which includes the insertion of background materials, targets, target materials, variable atmospheric environments, and variable thermal environments. These simulated data are then used to estimate probability of detection for a given probability of false alarm (Pd/Pfa) for simulated sensors at various ranges and atmospheric conditions. A difference between one or more embodiments of the current disclosure and previously employed CAD-based systems is that the one or more embodiments use actual, measured thermal imagery (i.e., true temperature and true emissivity).

The thermal imagery (or thermal data) is used to compute blackbody radiance at a range of wavelengths using the Planck function, which yields a simulated spectral hypercube of data. The radiance data are multiplied by spectral emissivity data for materials of interest from reference spectral libraries on a per-pixel basis. These 'colored' data are multiplied by a weighting function to permit mixtures of materials within a pixel, which are necessary for complex backgrounds like a desert consisting of sand and scrub. Simulated spatial/spectral targets may be added at this time. The radiance hypercube is then modified to add the effect of atmospheric transmission, path radiance, and turbulence. The hypercube is further modified to add sensor effects including noise and modulation transfer function (MTF) loss due to diffraction, sampling, optical aberrations, scanning, and line of sight motion. The net hypercube is then processed as if it were real data using standard HSI analysis tools permitting the estimation of the mission measures of effectiveness (MOE) of interest.

An embodiment provides realistic thermal and emissivity clutter that are not well represented in simple statistical models based on scene covariance data. It permits modifying background materials, as well as target materials, shapes, and temperatures in a way that simply using measured scene data would not support. Additionally, available measured thermal scene data could be used as the basis of a new simulation. Finally, the effects of the atmosphere, ambient temperature, and sensor measures of performance (MOPs) can be simulated to guide HSI/MSI system design and test.

As noted in the Background Section, when developing hyperspectral imagers (HSI), there are not any standard system performance analysis tools available as there are for conventional imaging systems (e.g., NV-IPM for FLIR systems). To address this absence, sensor performance can be simulated by manipulating existing data. However, suitable hyperspectral data for simulation and analysis are not generally available, especially in the thermal infrared. To address this issue, an embodiment creates simulated HSI data with realistic spatial and thermal variation, and inserts selected target and background emissivity for target detection calculations. Specifically, radiometrically calibrated long wave infrared (LWIR) imagery data are used to create simulated graybody hypercubes via Planck radiation. Spectral emissivity from library spectra is assigned to 'color' the background, e.g., for sand, scrub, grass, crops, asphalt, and concrete. Random graybody targets with realistic shape, size, thermal contrast, and target spectral emissivity are inserted. A Moderate Resolution Atmospheric Transmission (MODTRAN) process and modelled sensor response (modular transfer function (MTF), sampling, noise, etc.) are added to simulate measured data. The simulated data are run through a conventional processing, exploitation, and dissemination (PEI)) process to generate receiver operator characteristic (ROC) (Pd/Pfa) curves versus range.

If thermal and emissivity data are known, thermal hyperspectral data (radiance at any wavelength) can be calculated. To perform this, what is needed is a common data set for both mid wave and long wave radiation so that a direct comparison can be made. Temperature data and emissivity data are used to synthesize a dataset at any wavelength in the thermal infrared region, and then add different material types (spectral emissivity) (background and clutter). The Planck function, i.e., the relationship between radiance emitted from an object is used. Temperature and gray body emissivity are input into the Planck function, and then these data are multiplied by the spectral emissivity data.

In summary, an embodiment generates medium wave, long wave, and very long wave (MWIR/LWIR/VLWIR) simulated data from LWIR by extrapolating the Planck function. Real world spatial, thermal, and emissivity variation data are used to create realistic clutter, and random insertion of a statistically significant number of targets (e.g., 30) varies the local clutter around the target.

FIGS. 1A, 1B, 1C, 1D, and 2 illustrate a process to synthesize thermal hyperspectral imagery. FIGS. 1A, 1B, 1C, 1D, and 2 include process, operation, and/or feature blocks 102-170 and 205-242 respectively. Though arranged substantially serially in the example of FIGS. 1A, 1B, 1C, 10, and 2, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

FIGS. 1A, 1B, 1C, and 10 include two major branches, the synthesis of planetary radiance at the ground (102-120) and the synthesis of the planetary radiance at the aperture of the sensor (152-170). At 102, the spectral radiance at the ground is commenced for the hypercube simulation. As noted at 103, this commencement can include in an embodiment the use of a MATLAB application to execute many of the operations of FIGS. 1A, IB, 1C, 1D, and 2. At 104, the constants (e.g., Boltzman's constant, Planck's constant, and the speed of light in a vacuum) are defined and a wavelength vector is defined. As previously noted, an embodiment can operate over a range of wavelengths including medium wave and long wave. At 105, legacy temperature data and emissivity data are read into the system, and at 106, temperature data and emissivity imagery are calibrated using ground truth data collected during an airborne spectral data collection experiment. At 107, a particular temperature-emissivity file is chosen. Then, at 108, the calibrated 2-band temperature emissivity imagery is read. At 109, a particular spectral emissivity library is chosen, and at 110, target and background data are read from the spectral emissivity library. For example, spectral and emissivity data for concreate, sand, and soil could be read from the spectral emissivity library. At 111, a classifier rule image is chosen from previously calculated spectral classification results using the emissivity and temperature imagery. At 112, pixel class data are read. At 113, per pixel weighting is built for two or more classes. The weighting involves estimating the abundance of two or more materials, or classes, for each pixel. Standard spectral classification algorithms attempt to assign, or 'classify' each pixel in the data to a 'class,' or material, type based on a statistical comparison of that pixel to all other data in the data set. This results in a 'rule' image for each 'class' which may be interpreted as the likelihood that that pixel is assigned to that class, Here the rule image is used as a weighting function to calculate the 'abundance,' or fraction, of each class for each pixel. This permits the mixing of multiple classes, or materials, in each pixel, thereby creating a more continuous variation in materials, rather that distinct material boundaries.

Figure 1A:
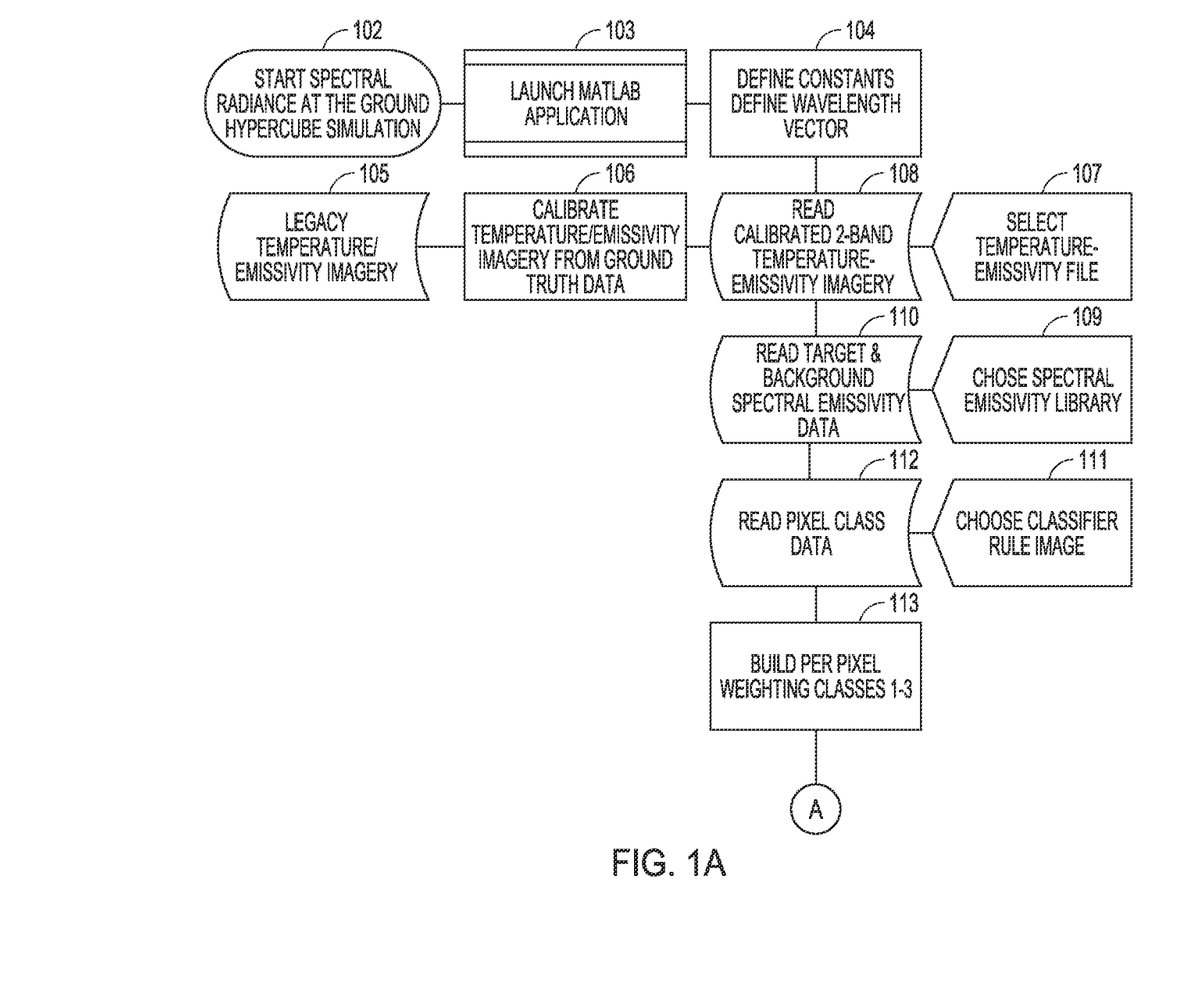
FIGS. 1A, 1B, 1C, and 1D are a block diagram of an embodiment to synthesize thermal spectral imagery.
Figure 1B:
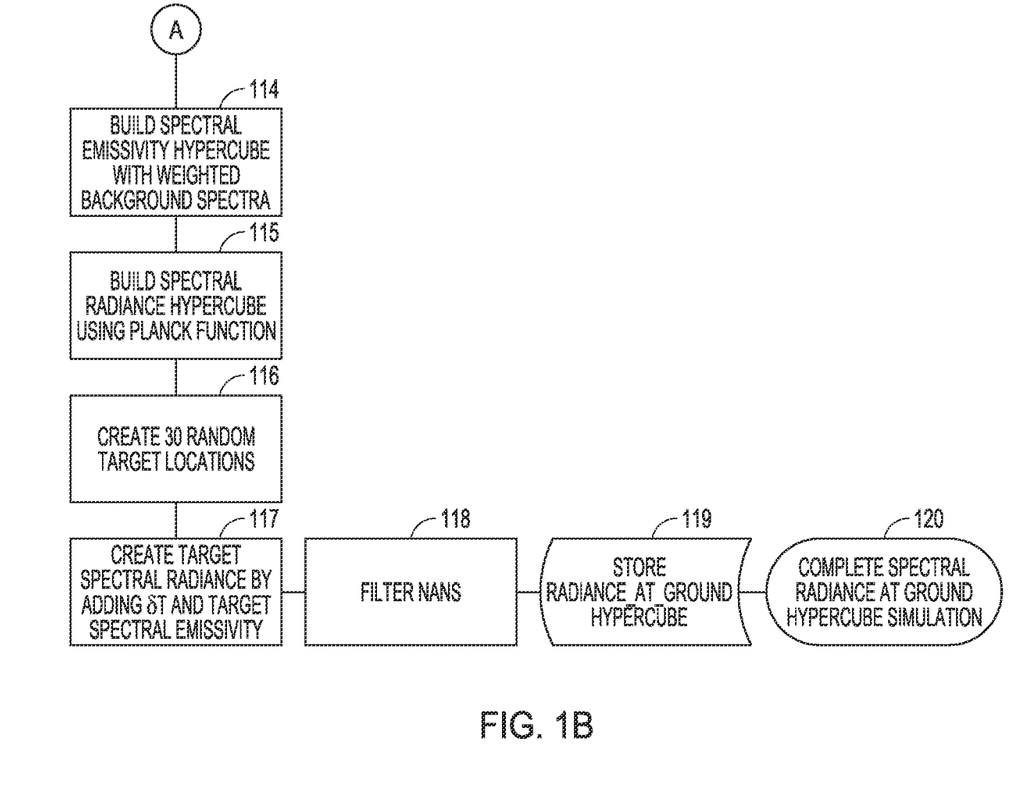

Then, at 114, a spectral emissivity hypercube is constructed using the weighted background spectra. At 115, a spectral radiance hypercube is constructed using the Planck function. The Planck function computes blackbody radiance from two variables: temperature and wavelength. Thus for every pixel in the original thermal data, the estimated temperature is used to compute blackbody radiance at many wavelengths, e.g. N distinct wavelengths. For an original thermal image of X by Y spatial pixels, there exists an X by Y by N 'hypercube' where each data point represents the blackbody radiance at one wavelength for one spatial pixel. Subsequently, each value in the blackbody hypercube is multiplied by the corresponding value in the spectral emissivity hypercube to create the radiance hypercube. The radiance hypercube then estimates the spectral radiance of each spatial pixel based on the pixel temperature and the material spectral emissivity.

At 116, a particular number of target locations are randomly selected for insertion into the imagery. In an embodiment, a useful number of target locations is about 30. At 117, spectral radiance is created for a particular target in the imagery by combining the delta T ($\delta T$) and the spectral emissivity for that particular target. At 118, the NaNs, that is, the invalid data points (Not a Number) are filtered from the calculation automatically. At 119, the radiance at ground is stored in a file. The synthesis of the radiance at ground is completed at 120.

Figure 1C:
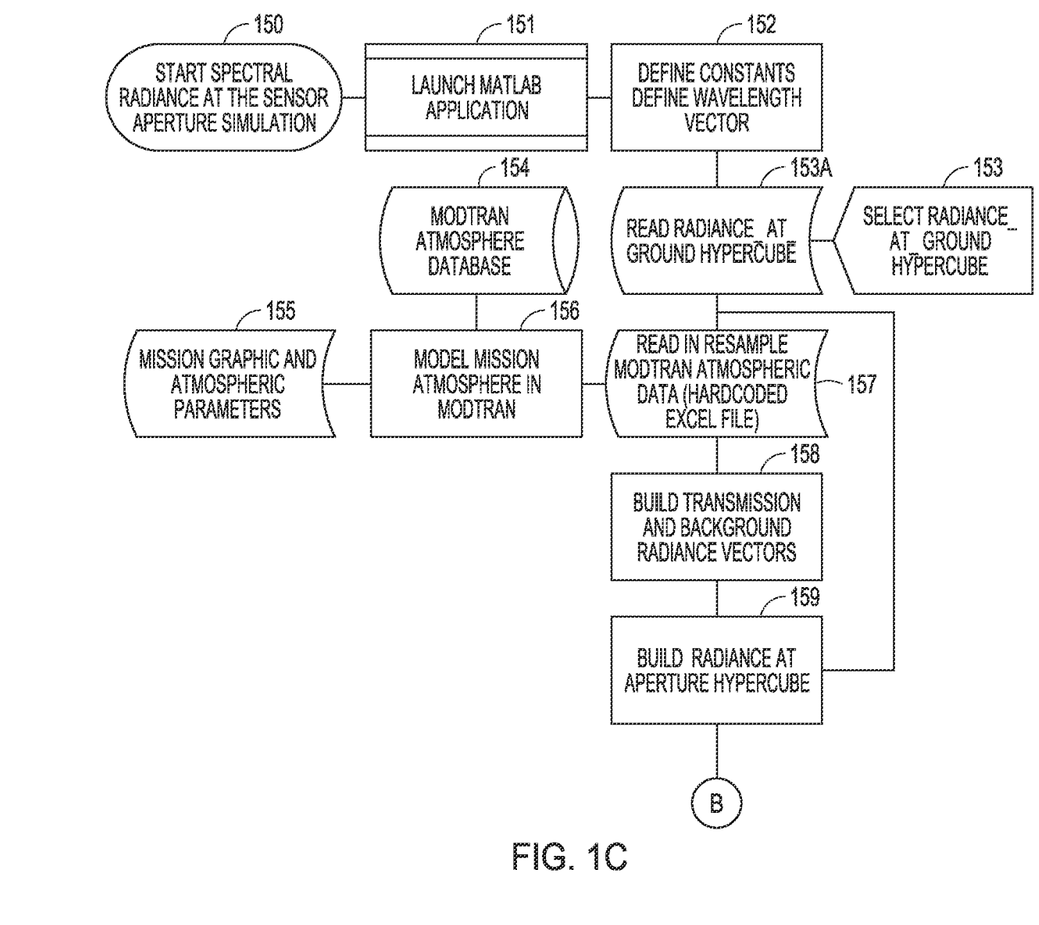
Figure 1D:
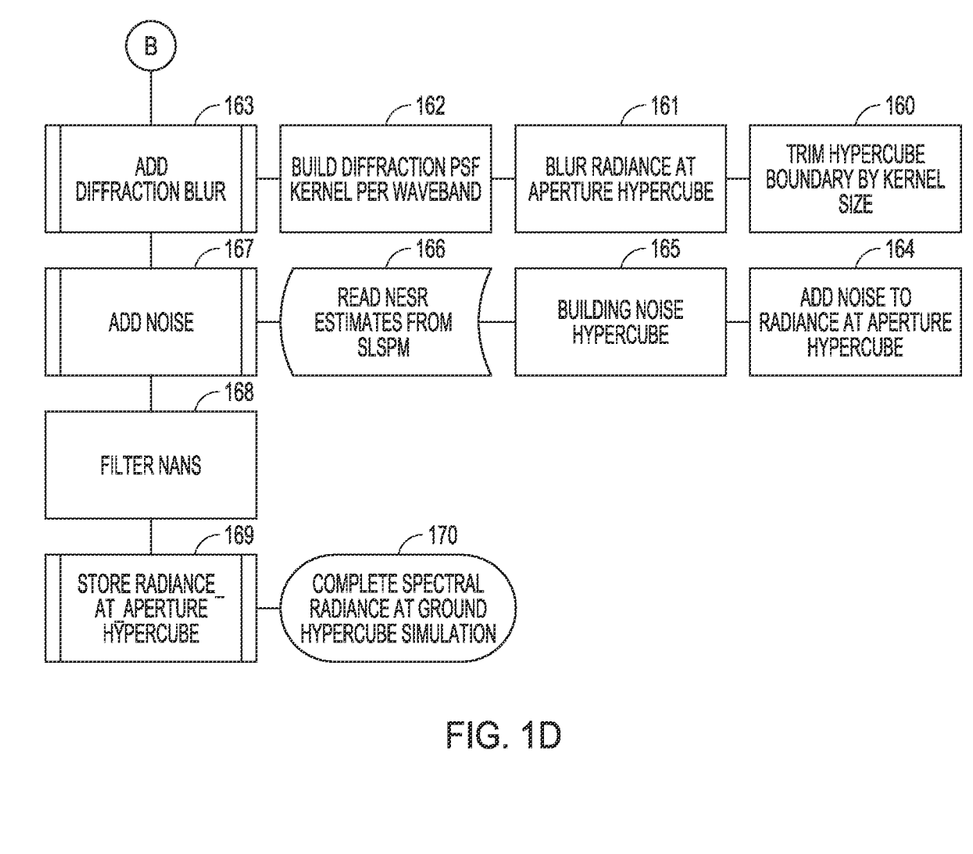

Referring to FIGS. 1C and 1D, the synthesis of the radiance at sensor aperture begins at 150. Similar to determining the radiance at ground, at 151 a MATLAB application is launched, and at 152, the constants (e.g., Boltzman's constant, Planck's constant, and the speed of light in a vacuum) are defined and a wavelength vector is defined. At 153, a particular radiance at ground hypercube, which was created in operations 102-120, is selected, and the radiance at ground hypercube is read into the system at 153A. The system has access to a MODTRAN atmosphere database at 154, mission graphic and atmospheric parameters at 155, and MODTRAN model mission atmospheric data at 156. At 157, the MODTRAN atmospheric data are read in and resampled. At 158, the system builds transmission and background radiance vectors, and at 159, radiance at e aperture hypercube is built. As indicated in FIG. 1C, operations 157-459 can be repeated.

Continuing with the synthesis at sensor aperture in FIG. 1D, at 160, the hypercube boundary is trimmed by the kernel size, the radiance at the hypercube is blurred at 161, and a diffraction point spread function (PSF) kernel per waveband is built at 162. Then, at 163, the diffraction blur is added to the hypercube. At 164, noise is added to the radiance at aperture hypercube, thereby building a noise hypercube at 165, and at 166, NESR (noise equivalent spectral radiance) estimates are read for each spectral channel from noise estimates generated in a separate calculation. Then, at 167, the noise is added to the hypercube, and at 168, like in the synthesis of radiance at ground, the NaNs is filtered. At 169, radiance at aperture hypercube is stored in a database, and the spectral radiance at aperture hypercube simulation is complete at 170.

Figure 2:
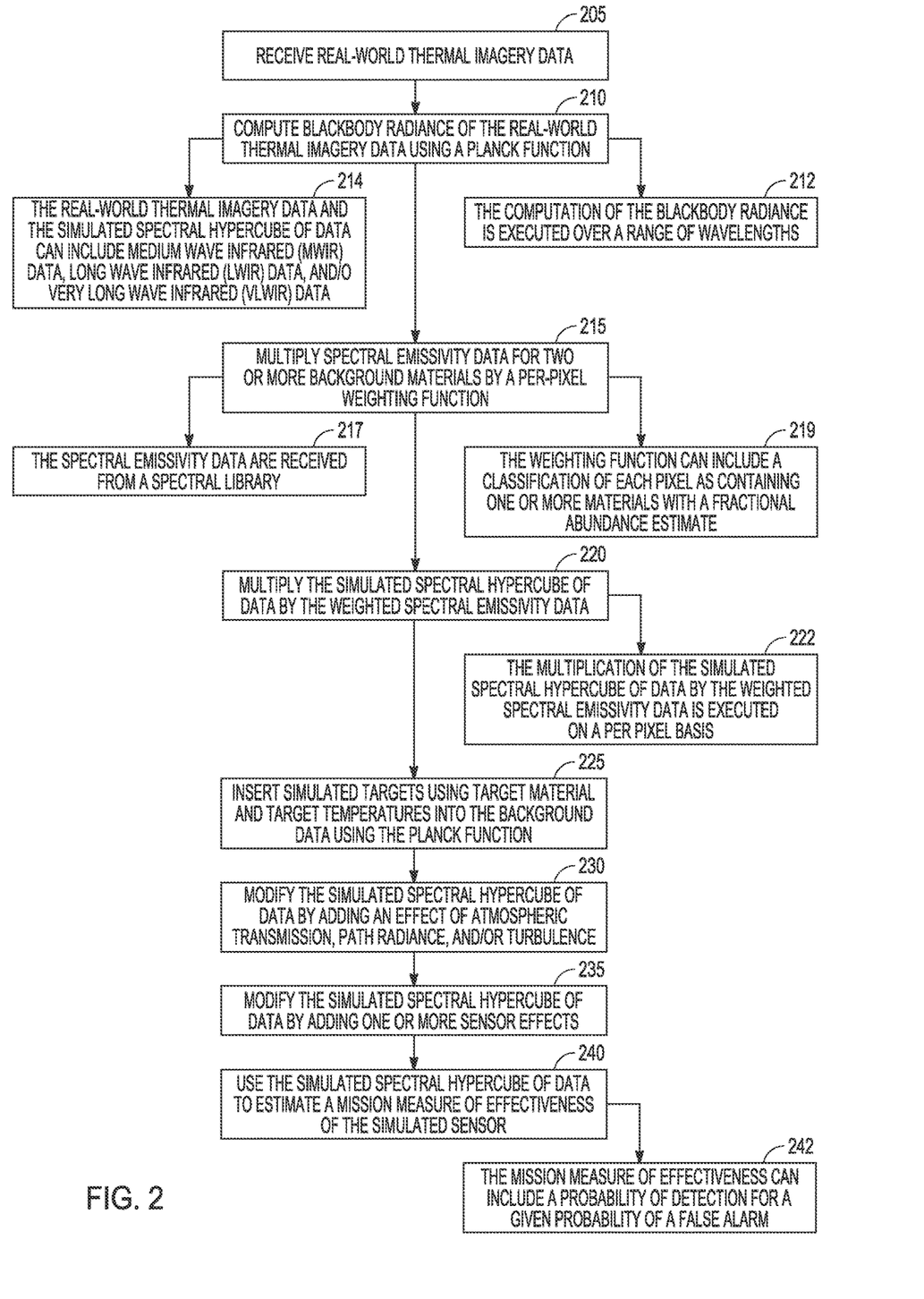
FIG. 2 is a block diagram of another embodiment to synthesize thermal spectral imagery.

FIG. 2 is a block diagram of another example process for simulating hyperspectral imaging data or multispectral imaging data for a simulated sensor for use in designing and testing infrared planetary observation systems. Referring specifically to FIG. 2, At 205, real-world thermal imagery data are received into a computer processor.

At 210, blackbody radiance of the real-world thermal imagery data is computed using a Planck function. This computation generates a simulated spectral hypercube of data. As noted above, the Planck function computes blackbody radiance from two variables: temperature and wavelength. Thus for every pixel in the original thermal data, the estimated temperature is used to compute blackbody radiance at many wavelengths, e.g. N distinct wavelengths. For an original thermal image of X by Y spatial pixels, there exists an X by Y by N 'hypercube' where each data point represents the blackbody radiance at one wavelength for one spatial pixel. Subsequently, each value in the blackbody hypercube is multiplied by the corresponding value in the spectral emissivity hypercube to create the radiance hypercube. The radiance hypercube then estimates the spectral radiance of each spatial pixel based on the pixel temperature and the material spectral emissivity. In an embodiment, the hypercube includes spatial data and 256 spectral bands (of each wavelength band) of data. At 212, the computation of the blackbody radiance is executed over a range of wavelengths. As indicated at 214, the real-world thermal imagery data and the simulated spectral hypercube of data can include one or more of medium wave infrared (MWIR) data, long wave infrared (LWIR) data, and very long wave infrared (VLWIR) data. As noted, the black body radiance (temperature per pixel) is used to create Planck curves, which are high in long wave data but low in medium wave data.

At 215, spectral emissivity data for two or more background materials are multiplied by a per-pixel weighting function. This multiplication generates weighted spectral emissivity data and a mixture of materials within a pixel. At 217, the spectral emissivity data are received from a spectral library. As indicated at 219, the weighting function can include a classification of each pixel as containing one or more materials with a fractional abundance estimate. As noted above, the weighting involves estimating the abundance of two or more materials, or classes, for each pixel. Standard spectral classification algorithms attempt to assign, or 'classify' each pixel in the data to a 'class,' or material, type based on a statistical comparison of that pixel to all other data in the data set. This results in a 'rule' image for each 'class' which may be interpreted as the likelihood that that pixel is assigned to that class. Here the rule image is used as a weighting function to calculate the 'abundance,' or fraction, of each class for each pixel. This permits the mixing of multiple classes, or materials, in each pixel, thereby creating a more continuous variation in materials, rather that distinct material boundaries.

At 220, the simulated spectral hypercube of data is multiplied by the weighted spectral emissivity data. This multiplication generates background data in the simulated spectral hypercube of data. As indicated at 222, the multiplication of the simulated spectral hypercube of data by the weighted spectral emissivity data is executed on a per pixel basis. In an embodiment, thermal and emissivity data that are similar to each other across a scene are used and multiplied by emissivity data from a spectral library curve for a particular material (e.g., sand) or object (e.g., a tank). The data are classified to create the weighting function so that a particular pixel can represent two or more materials, for example, both sand and concrete. Prior systems permit only one material per pixel. For every pixel in a scene, the weighting function and library spectral data are applied and an emissivity value is created for each pixel.

At 225, simulated targets using target material and target temperatures are inserted into the background data using the Planck function. Simulated target radiance is estimated from target material spectral emissivity and target temperatures using the Planck function. These radiance values are inserted into the background data for specific pixels in a shape representing a specific target type. At 230, the simulated spectral hypercube of data is modified by adding one or more of an effect of atmospheric transmission, path radiance, and turbulence. Regarding the addition of the atmospheric data, it is noted that the simulation up to this point has been at the ground plane, and therefore did not include these atmospheric effects. This is the reason that transmission curves of the atmosphere and path radiance (amount of radiance emitted and scattered by atmosphere) are added.

At 235, the simulated spectral hypercube of data is modified by adding one or more sensor effects. These sensor effects can include such things as noise, a modular transfer function loss due to diffraction, a sampling of the simulated sensor, an optical aberration, a scanning of the simulated sensor, and a line-of-sight motion of the simulated sensor.

At 240, the simulated spectral hypercube of data is used to estimate a mission measure of effectiveness of the simulated sensor. As indicated at 242, the mission measure of effectiveness can include a probability of detection for a given probability of a false alarm. Operations 240 and 242 involve the use of standard techniques, such as principal component analysis (PCA) to find the most correlated data and hence the simulated targets.

Figure 3:
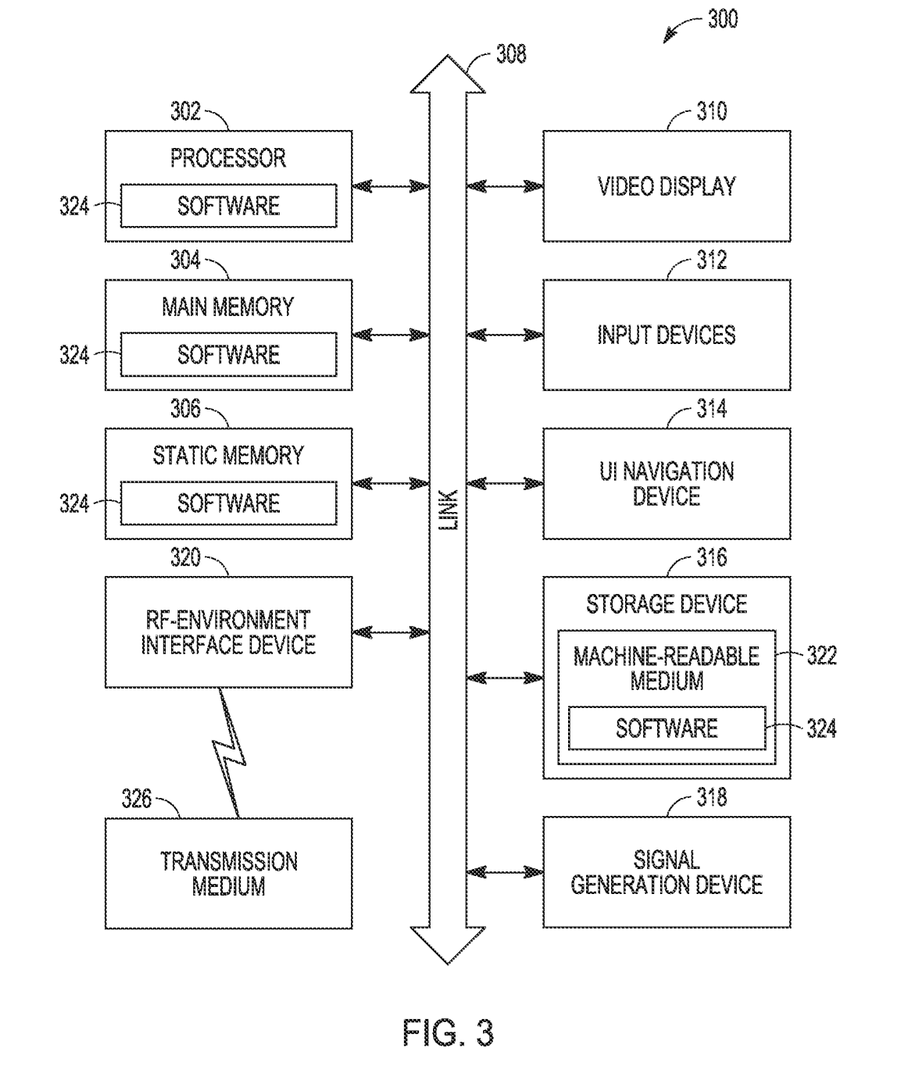
FIG. 3 is a block diagram of a computer architecture upon which one or more of the disclosed embodiments can execute.

FIG. 3 is a block diagram illustrating a computing and communications platform 300 in the example form of a general-purpose machine on which some or all the operations of FIGS. 1A, 1D, and 2 may be carried out according to various embodiments. In certain embodiments, programming of the computing platform 300 according to one or more particular algorithms produces a special-purpose machine upon execution of that programming. In a networked deployment, the computing platform 300 may operate in the capacity of either a server or a client machine in server-client network environments, or it may act as a peer machine in peer-to-peer (or distributed) network environments.

Example computing platform 300 includes at least one processor 302 (e.g., a central processing unit (CPU), a graphics processing unit (GPU) or both, processor cores, compute nodes, etc.), a main memory 304 and a static memory 306, which communicate with each other via a link 308 (e.g., bus). The computing platform 300 may further include a video display unit 310, input devices 312 (e.g., a keyboard, camera, microphone), and a user interface (UI) navigation device 314 (e.g., mouse, touchscreen). The computing platform 300 may additionally include a storage device 316 (e.g., a drive unit), a signal generation device 318 (e.g., a speaker), and a RE-environment interface device WED) 320.

The storage device 316 includes a non-transitory machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the computing platform 300, with the main memory 304, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 320 includes radio receiver circuitry, along with analog-to-digital conversion circuitry, and interface circuitry to communicate via link 308 according to various embodiments. Various form factors are contemplated for RFEID 320. For instance, RFEID may be in the form of a wideband radio receiver, or scanning radio receiver, that interfaces with processor 302 via link 308. In one example, link 308 includes a PCI Express (PCIe) bus, including a slot into which the NIC form-factor may removably engage. In another embodiment, RFEID 320 includes circuitry laid out on a motherboard together with local link circuitry, processor interface circuitry, other input/output circuitry, memory circuitry, storage device and peripheral controller circuitry, and the like. In another embodiment, RFEID 320 is a peripheral that interfaces with link 308 via a peripheral input/output port such as a universal serial bus (USB) port. RFEID 320 receives RF emissions over wireless transmission medium 326 RFEID 320 may be constructed to receive RADAR signaling, radio communications signaling, unintentional emissions, or some combination of such emissions.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process for simulating hyperspectral imaging data or multispectral imaging data for a simulated sensor for use in designing and testing infrared planetary observation systems, the process comprising:
   receiving into a computer processor real-world thermal imagery data and spectral emissivity for two or more background materials;
   computing blackbody radiance of the real-world thermal imagery data using a Planck function, thereby generating a simulated spectral hypercube of data;
   multiplying the spectral emissivity data for two or more background materials by a per-pixel weighting function, thereby generating weighted spectral emissivity data and a mixture of materials within a pixel;
   multiplying the simulated spectral hypercube of data by the weighted spectral emissivity data, thereby generating background data in the simulated spectral hypercube of data;
   inserting simulated targets using target material and target temperatures into the background data using the Planck function;
   modifying the simulated spectral hypercube of data by adding one or more of an effect of atmospheric transmission, path radiance, and turbulence;
   modifying the simulated spectral hypercube of data by adding one or more sensor effects comprising noise, a modular transfer function loss due to diffraction, a sampling of the simulated sensor, an optical aberration, a scanning of the simulated sensor, and a line-of-sight motion of the simulated sensor; and
   using the simulated spectral hypercube of data to estimate a mission measure of effectiveness of the simulated sensor.

2. The process of claim 1, wherein the mission measure of effectiveness comprises a probability of detection for a given probability of a false alarm.

3. The process of claim 1, wherein the computation of the blackbody radiance is executed over a range of wavelengths.

4. The process of claim 1, wherein the spectral emissivity data are received from a spectral library.

5. The process of claim 1, wherein the multiplication of the simulated spectral hypercube of data by the weighted spectral emissivity data is executed on a per pixel basis.

6. The process of claim 1, wherein the weighting function comprises a classification of each pixel as containing one or more materials with a fractional abundance estimate.

7. The process of claim 1, wherein the real-world thermal imagery data and the simulated spectral hypercube of data comprise one or more of medium wave infrared (MWIR) data, long wave infrared (LWIR) data, and very long wave infrared (VLWIR) data.

8. A non-transitory machine-readable medium comprising instructions that when executed by a computer processor execute a process comprising:
receiving into a computer processor real-world thermal imagery data and spectral emissivity for two or more background materials;
computing blackbody radiance of the real-world thermal imagery data using a Planck function, thereby generating a simulated spectral hypercube of data;
multiplying the spectral emissivity data for two or more background materials by a per-pixel weighting function, thereby generating weighted spectral emissivity data and a mixture of materials within a pixel;
multiplying the simulated spectral hypercube of data by the weighted spectral emissivity data, thereby generating background data in the simulated spectral hypercube of data;
inserting simulated targets using target material and target temperatures into the background data using the Planck function;
modifying the simulated spectral hypercube of data by adding one or more of an effect of atmospheric transmission, path radiance, and turbulence;
modifying the simulated spectral hypercube of data by adding one or more sensor effects comprising noise, a modular transfer function loss due to diffraction, a sampling of the simulated sensor, an optical aberration, a scanning of the simulated sensor, and a line-of-sight motion of the simulated sensor; and
using the simulated spectral hypercube of data to estimate a mission measure of effectiveness of the simulated sensor.

9. The non-transitory machine-readable medium of claim 8, wherein the mission measure of effectiveness comprises a probability of detection for a given probability of a false alarm.

10. The non-transitory machine-readable medium of claim 8, wherein the computation of the blackbody radiance is executed over a range of wavelengths.

11. The non-transitory machine-readable medium of claim 8, wherein the spectral emissivity data are received from a spectral library.

12. The non-transitory machine-readable medium of claim 8, wherein the multiplication of the simulated spectral hypercube of data by the weighted spectral emissivity data is executed on a per pixel basis.

13. The non-transitory machine-readable medium of claim 8, wherein the weighting function comprises a classification of each pixel as containing one or more materials with a fractional abundance estimate.

14. The non-transitory machine-readable medium of claim 8, wherein the real-world thermal imagery data and the simulated spectral hypercube of data comprise one or more of medium wave infrared (MWIR) data, long wave infrared (LWIR) data, and very long wave infrared, (VLWIR) data.

15. A system comprising:
a computer processor; and
a computer memory coupled to the computer processor;
wherein the computer processor and the computer memory are operable for:
receiving into a computer processor real-world thermal imagery data and spectral emissivity for two or more background materials;
computing blackbody radiance of the real-world thermal imagery data using a Planck function, thereby generating a simulated spectral hypercube of data;
multiplying the spectral emissivity data for two or more background materials by a per-pixel weighting function, thereby generating weighted spectral emissivity data and a mixture of materials within a pixel;
multiplying the simulated spectral hypercube of data by the weighted spectral emissivity data, thereby generating background data in the simulated spectral hypercube of data;
inserting simulated targets using target material and target temperatures into the background data using the Planck function;
modifying the simulated spectral hypercube of data by adding one or more of an effect of atmospheric transmission, path radiance, and turbulence;
modifying the simulated spectral hypercube of data by adding one or more sensor effects comprising noise, a modular transfer function loss due to diffraction, a sampling of the simulated sensor, an optical aberration, a scanning of the simulated sensor, and a line-of-sight motion of the simulated sensor; and
using the simulated spectral hypercube of data to estimate a mission measure of effectiveness of the simulated sensor.

16. The system of claim 15, wherein the mission measure of effectiveness comprises a probability of detection for a given probability of a false alarm.

17. The system of claim 15, wherein the computation of the blackbody radiance is executed over a range of wavelengths.

18. The system of claim 15, wherein the spectral emissivity data are received from a spectral library.

19. The system of claim 15, wherein the multiplication of the simulated spectral hypercube of data by the weighted spectral emissivity data is executed on a per pixel basis.

20. The system of claim 15, wherein the weighting function comprises a classification of each pixel as containing one or more materials with a fractional abundance estimate; and wherein the real-world thermal imagery data and the simulated spectral hypercube of data comprise one or more of medium wave infrared (MWIR) data, long wave infrared (LWIR) data, and very long wave infrared (VLWIR) data.

* * * * *